(12) United States Patent
Chen et al.

(10) Patent No.: US 7,815,019 B2
(45) Date of Patent: Oct. 19, 2010

(54) BRAKING MECHANISM

(75) Inventors: Shun-Min Chen, Taipei (TW); Wen Qu Hu, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 993 days.

(21) Appl. No.: 11/606,101

(22) Filed: Nov. 30, 2006

(65) Prior Publication Data

US 2008/0000732 A1 Jan. 3, 2008

(51) Int. Cl.
*B62B 9/08* (2006.01)

(52) U.S. Cl. .................... 188/20; 188/2 D; 188/328

(58) Field of Classification Search ............ 188/7, 188/19, 20, 2 D, 2 F, 77 R, 77 W, 328, 337
See application file for complete search history.

(56) References Cited

U.S. PATENT DOCUMENTS 5,131,509 A * 7/1992 Moon et al. ............ 188/77 R
5,390,943 A * 2/1995 Hedrick ................ 280/47.24
6,142,264 A * 11/2000 Lin ......................... 188/75
2004/0144600 A1   7/2004 Ikegami et al.
2006/0086574 A1   4/2006 Horst

FOREIGN PATENT DOCUMENTS

DE   10125422 A1 * 11/2002
GB    2433968 A  *  7/2007

* cited by examiner

*Primary Examiner*—Pam Rodriguez
(74) *Attorney, Agent, or Firm*—Bacon & Thomas, PLLC (57) ABSTRACT

The present invention provides a braking mechanism comprising a brake cable set, a spring, a connector, a pair of brake shoes, a brake band, a base, and a brake drum. The brake cable set makes the connector move downwards upon braking, such that the connector coupled to the pair of brake shoes rotates to contact the brake band and thus cause friction, whereby achieving the object of braking.

16 Claims, 8 Drawing Sheets

BRAKING MECHANISM

BACKGROUND OF THE INVENTION

1. Technical Field

The present invention relates to a braking mechanism, in particular to a braking mechanism used in a stroller.

2. Description of Related Art

Various braking mechanisms have been proposed in the prior art. For instance, U.S. Pat. No. 6,142,264 discloses a brake device including a brake drum and a pair of semicircular brake shoes, wherein the brake drum rotates along with the wheel and the pair of brake shoes are disposed pivotally with respect to the center of the brake drum by a pivot. The pair of brake shoes surround the brake drum respectively. Upon braking, the ends of the pair of brake shoes separating from the pivot are subjected to an external force, the pair of brake shoes thus hoop the brake drum pivotally to cease the rotation of the wheel. Since this conventional brake device employs the brake shoes in pair, a steady braking effect may be achieved no matter the stroller is moving forward or backward.

However, since the aforementioned brake device is controlled by a pedal or a handle disposed adjacent to the wheel, a user must stamp on the pedal by foot or bend down to pull the handle by hand for braking, which is still inconvenient and hazardous. Therefore, in view of the drawbacks, the present invention provides a braking mechanism controlled by a brake cable set in combination with a hand brake, which involves the advantages of safety, easy manipulation, steady braking effect, and simple structure.

SUMMARY OF THE INVENTION

To achieve the aforementioned objects, the braking mechanism of the present invention comprises a brake cable set, a spring, a connector, a pair of brake shoes, a brake band, a base, and a brake drum. The braking mechanism may further comprises a cover and rivets, wherein the braking mechanism is installed onto a wheel through the brake drum which rotates along with the wheel. The connector is disposed in the base with one end of the connector connecting with one end of the spring. The cable in the brake cable set passes through the connector and the spring. One end of the cable is further secured to the base. The spring is located between the connector and the end of the cable secured to the base. One end of the tube in the brake cable set is connected to the connector, and the tube may slide in the connector. Each one of the pair of brake shoes comprises a slot to connect with the pivots on the connector in one end, wherein the pivots may slide in the slots. The brake band is disposed in the base and embraces the brake drum tightly so that the brake band may rotate along with the brake drum. The outer periphery of the brake band comprises a braking surface, and the inner periphery of the brake band comprises at least one protrusion engaging with at least one recess on the outer periphery of the brake drum. The other end of the pair of brake shoes are disposed symmetrically and pivotally in the base, wherein the pair of brake shoes may rotate pivotally in the base and move toward the brake band and thus contact with the brake band. Each of the pair of brake shoes comprises a braking surface, wherein the braking surfaces of the pair of brake shoes are disposed opposite to the braking surface of the brake band. The cover includes an opening to expose an upper portion of the brake drum. The cover is mounted to the base by rivets.

Upon braking, the tube in the brake cable set is subjected to a force to move along the cable in a direction toward the brake band, whereby pushing the connector to move in the same direction. The pair of brake shoes are then caused to move toward the brake band and contact with the brake band, and thus generate friction therebetween, so as to achieve the purpose of braking.

All the braking surfaces of the pair of brake shoes and the brake band employed in the present invention are an arc-shaped even surface. However, in order to improve the friction between the pair of brake shoes and the brake band, all the braking surfaces of the pair of brake shoes and the brake band may be formed in shape of serration, or the braking surface of only one of the pair of brake shoes and the braking surface of the brake band may be formed in shape of serration.

DETAILED DESCRIPTION

The braking mechanism of the present invention will be described in detail with reference to preferred embodiments in conjunction with the accompanying drawings. However, certain known details are omitted hereinafter in order not to obscure the technical features of the present invention.

Figure 1:
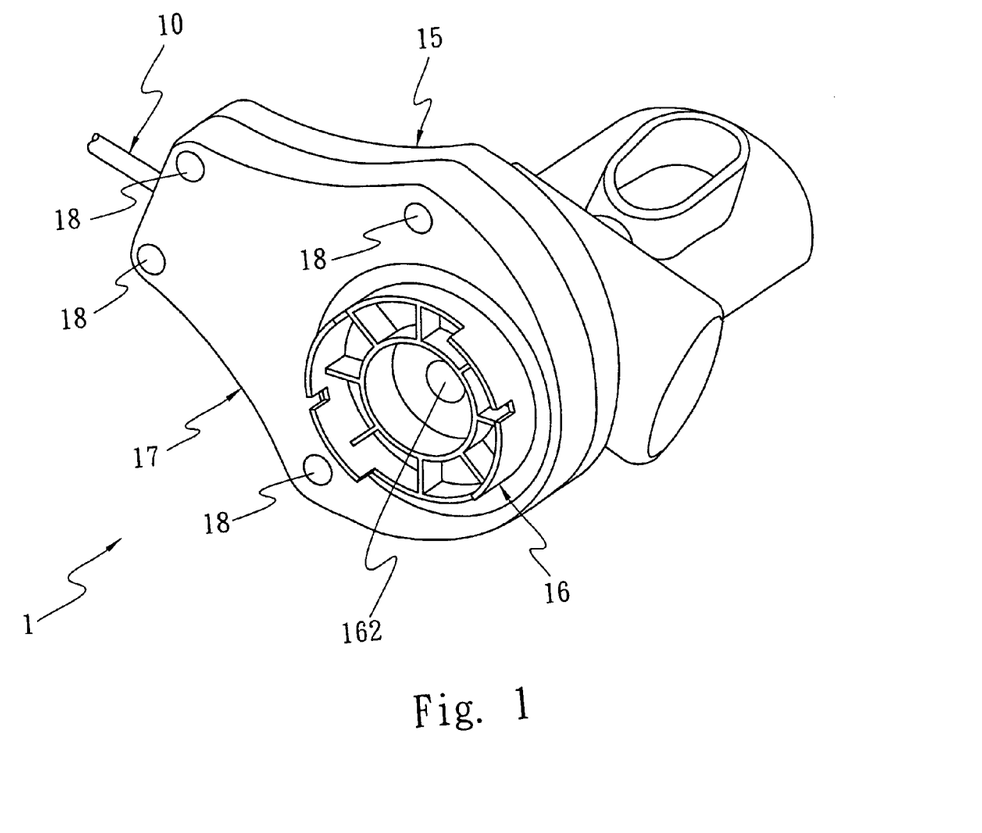
FIG. 1 is a schematic view of an embodiment of a braking mechanism according to the present invention.
Figure 2:
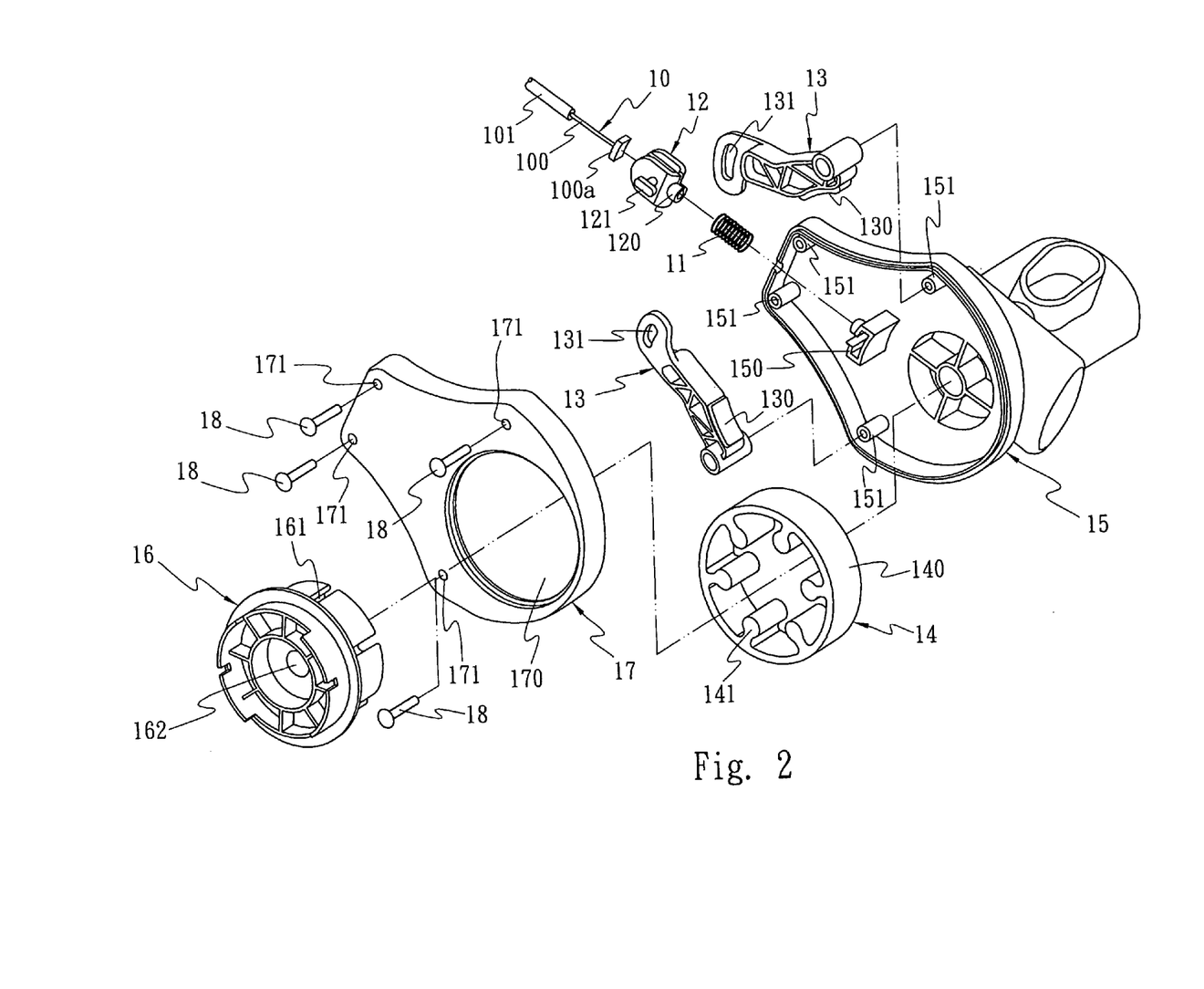
FIG. 2 is an exploded view of the braking mechanism of the embodiment.

First, please refer to FIGS. 1 and 2, which are a schematic view and an exploded view of the braking mechanism 1 of the present invention. As shown in the figures, the braking mechanism 1 comprises a brake cable set 10, a spring 11, a connector 12, a pair of brake shoes 13, a brake band 14, a base 15, and a brake drum 16. Additionally, the braking mechanism 1 may also comprise a cover 17 and rivets 18.

The brake cable set 10 includes a cable 100 and a tube 101 that the cable 100 is passed through, wherein the end 100a of the cable 100 is in a shape of a lump. The center of the connector 12 comprises a cavity (denoted by the reference numeral "122" in FIGS. 5A and 5B), and the rear end 120 of the connector 12 is in tube shape. A pivot 121 is disposed on both of the front and rear sides of the connector 12. One end of each brake shoes 13 comprises a slot 131, and a first braking surface 130 which is substantially arc-shaped is disposed on the lateral side of each of the brake shoes 13. The brake band 14 is in a shape of ring and has an outer periphery where disposed a second braking surface 140 and an inner periphery where extended a plurality of protrusions 141. Both of the first braking surface 130 and the second braking surface 140 are even. A cable fixing portion 150 and rivet holes 151 are disposed in the base 15. The brake drum 16 comprises a central through hole 162, and a plurality of recesses 161 are disposed on the rear of the brake drum 16. The cover 17 includes an opening 170 and rivet holes 171 matching the rivet holes 151 in the base 15.

Figure 3:
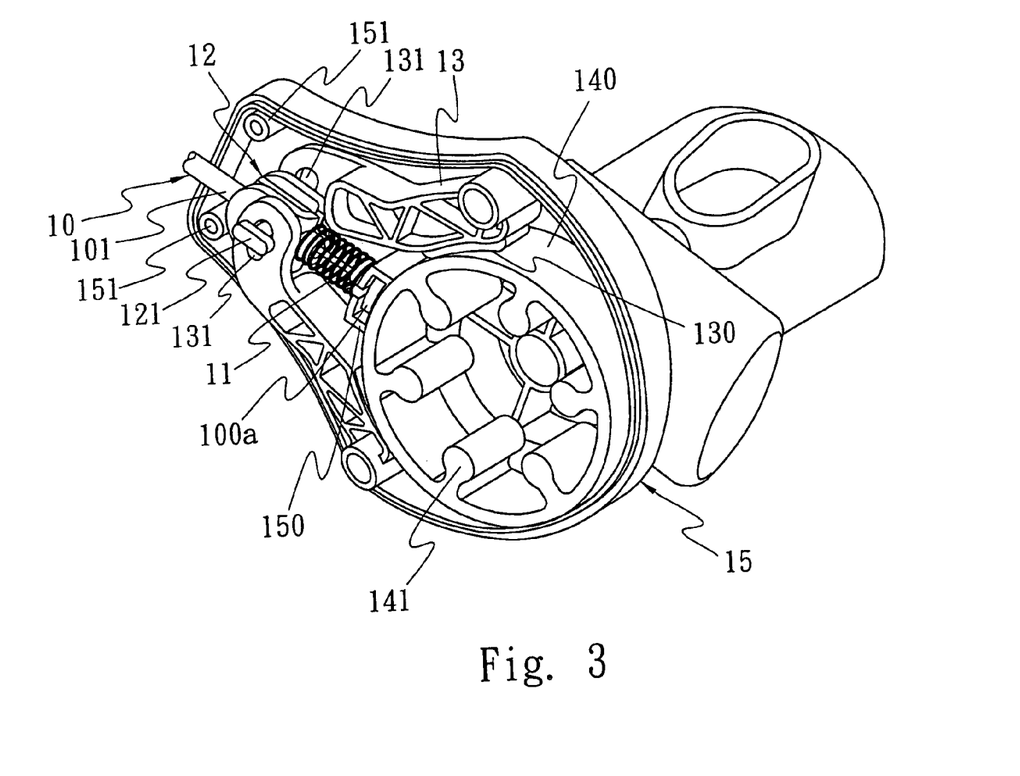
FIG. 3 is a schematic view of the braking mechanism of the embodiment after removal of the cover and the brake drum.

Further, with reference to FIG. 3, it illustrates a part of the braking mechanism 1. As shown, the connector 12 is disposed in the front of the base 15 with the rear end 120 of the connector 12 coupled to one end of the spring 11 and the other end of the spring 11 abutted against the cable fixing portion 150 of the base 15. The cable 100 passes through the cavity of the connector 12, and the rear part of the cable 100 not covered by the tube 101 further passes through the spring 11. The end 100a of the cable 100 is fixed to the cable fixing portion 150 of the base 15. The end of the tube 101 is disposed in the cavity of the connector 12 so that the tube 101 may slide in the cavity.

The slots 131 of the brake shoes 13 are coupled to the pivots 121 on the connector 12 respectively, whereby the pair of brake shoes 13 are mounted onto the connector 12 and the pivots 121 may slide in the slots 131. The pivots 121 of the connector 12 may consist of a rivet. Further, it should be noted that although it is described in this embodiment that a pivot 121 is disposed on both of the front and rear sides of the connector 12, the connector 12 may only comprises a pivot 121 and the two brake shoes 13 are both coupled to the pivot 121 in another embodiments. The brake band 14 is disposed in the back of the base 15, wherein the brake band 14 is in ring shape and encircled a rear part of the brake drum 16 tightly. The protrusions 141 of the brake band 14 are engaged with the recesses 161 on the rear of the brake drum 16. The rear ends of the pair of brake shoes 13 are disposed symmetrically and pivotally on the rivet holes 151 (not shown in this figure), such that the pair of brake shoes 13 are able to rotate pivotally in the base 15. The braking surfaces 130 of the pair of brake shoes 13 are disposed opposite to the braking surface 140 of the brake band 14.

The opening 170 of the cover 17 exposes a front part of the brake drum 16. The cover 17 is mounted onto the base 15 by inserting the rivets 18 into the rivet holes 151 and 171.

Figure 4:
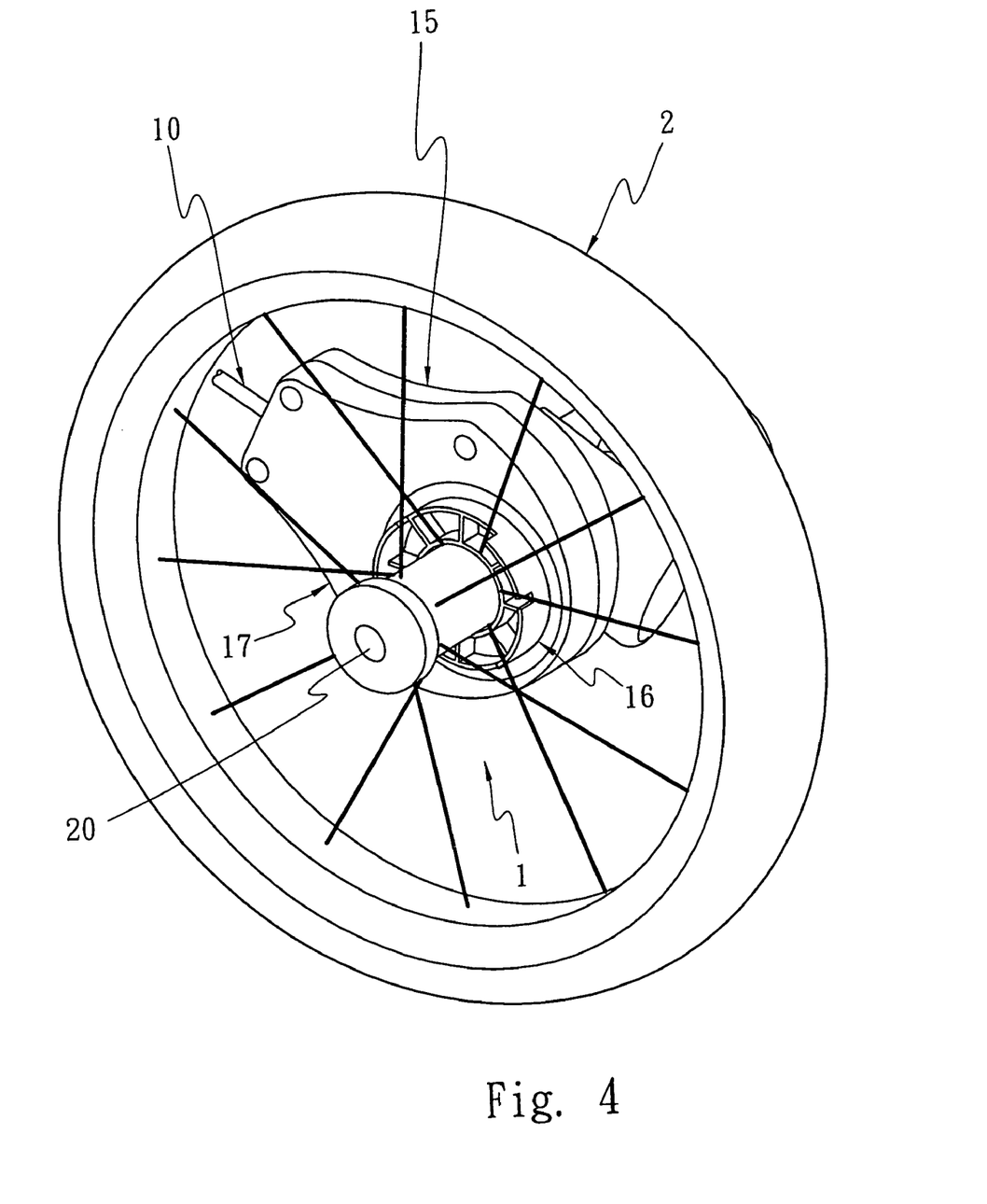
FIG. 4 is a schematic view of the braking mechanism of the embodiment being assembled with a wheel.

FIG. 4 is a schematic view of the braking mechanism 1 of the present invention being assembled with a wheel 2, wherein the brake drum 16 is coupled to the wheel 2 and the braking mechanism 1 is assembled with the wheel 2 by inserting an axle 20 into the center of the wheel 2 and the central through hole 162 (not shown in this figure) of the brake drum 16. Although not shown in this figure, according to the foregoing description and the figures, it is realized that the axle 20 also passes through the opening 170 of the cover 17 and the center of the brake band 14. In this manner, the wheel 2, the brake drum 16, and the brake band 14 (not shown in this figure) may rotate around the axle 20 concurrently.

Figure 5A:
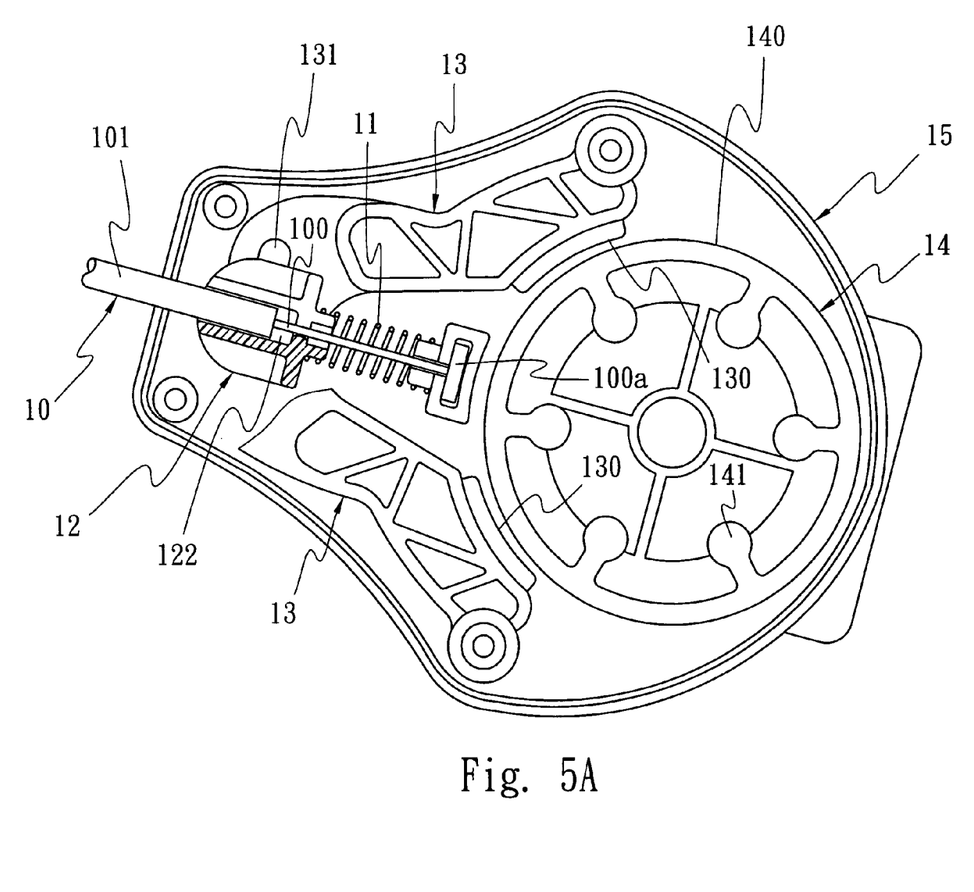
FIGS. 5A and 5B show the braking mechanism of the embodiment in non-braking status and braking status, wherein the connector and the spring are represented in cross-sectional views.
Figure 5B:
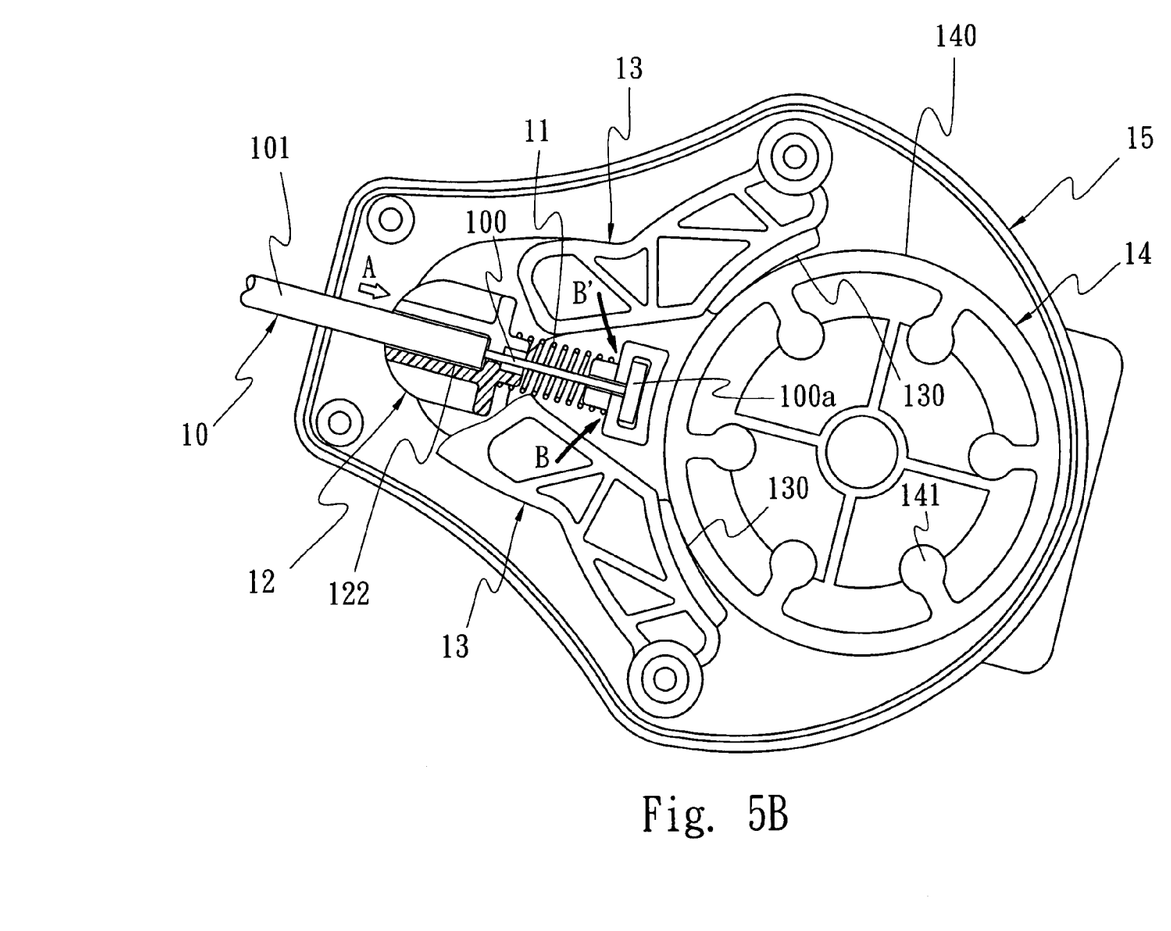

Next, please refer to FIGS. 5A and 5B, which illustrate the braking mechanism 1 of the embodiment in non-braking status and braking status respectively, in which the connector 12 and the spring 11 are represented in cross-sectional view. As shown in FIG. 5A, since no force is applied to the tube 101 in the brake cable set 10 in non-braking status, the spring 11 is relaxed and the braking surfaces 130 of the brake shoes 13 are not in contact with the braking surface 140 of the brake band 14. Upon braking, as shown in FIG. 5B, the tube 101 in the brake cable set 10 is subjected to a force to move along the cable 100 in a direction toward the brake band 14 (the direction indicated by the arrow A), whereby pushing the connector 12 to move in the same direction and compressing the spring 11. Because the pivots 121 of the connector 12 are coupled to the brake shoes 13 at the slots 131, when the connector 12 is moved, the pivots 121 may slide in the slots 131 and make the pair of brake shoes 13 move toward the brake band 14 in the direction indicated by the arrows B and B' respectively, whereby leading the braking surfaces 130 of the brake shoes 13 to contact the braking surface 140 of the brake band 14 and generating friction therebetween. Because the brake band 14 rotates along with the brake drum 16 and the wheel, when the braking surface 140 of the brake band 14 is rubbed against by the braking surfaces 130 of the brake shoes 13, the rotation speed of the wheel is lowered and the purpose of braking is achieved.

Further, when the force applied to the tube 101 is relieved, since the spring 11 is not compressed by an external force, the spring 11 may push the connector 12 to move in an opposite direction (the direction opposite to that indicated by the arrow A), whereby making the pair of brake shoes 13 pivotal relative to the base 15 and move in the directions opposite to those indicated by the arrows B and B' respectively, such that the braking surfaces 130 of the brake shoes 13 and the braking surface 140 of the brake band 14 are separate and return to the status illustrated by FIG. 5A.

Figure 6A:
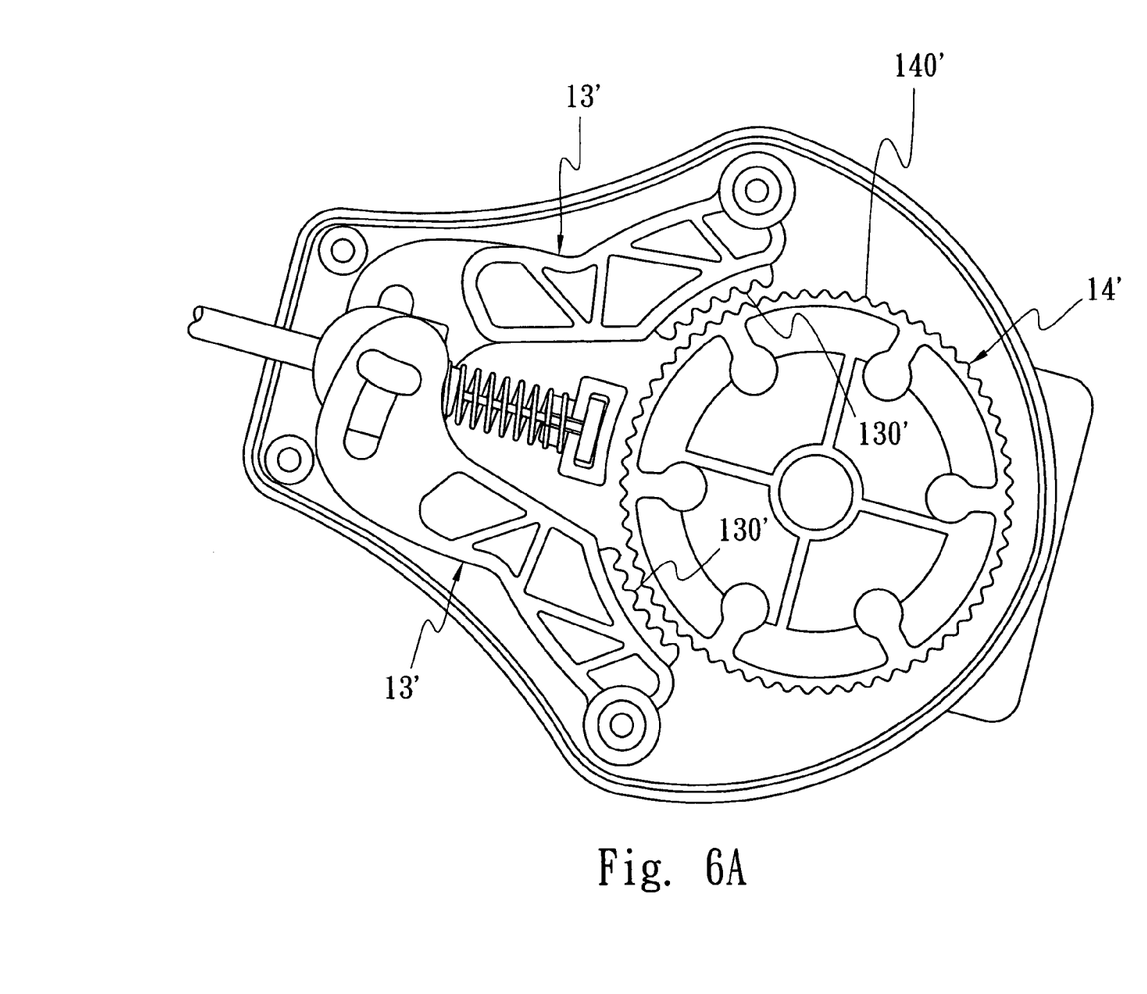
FIGS. 6A and 6B show another embodiment of the braking mechanism of the present invention in non-braking status and braking status.
Figure 6B:
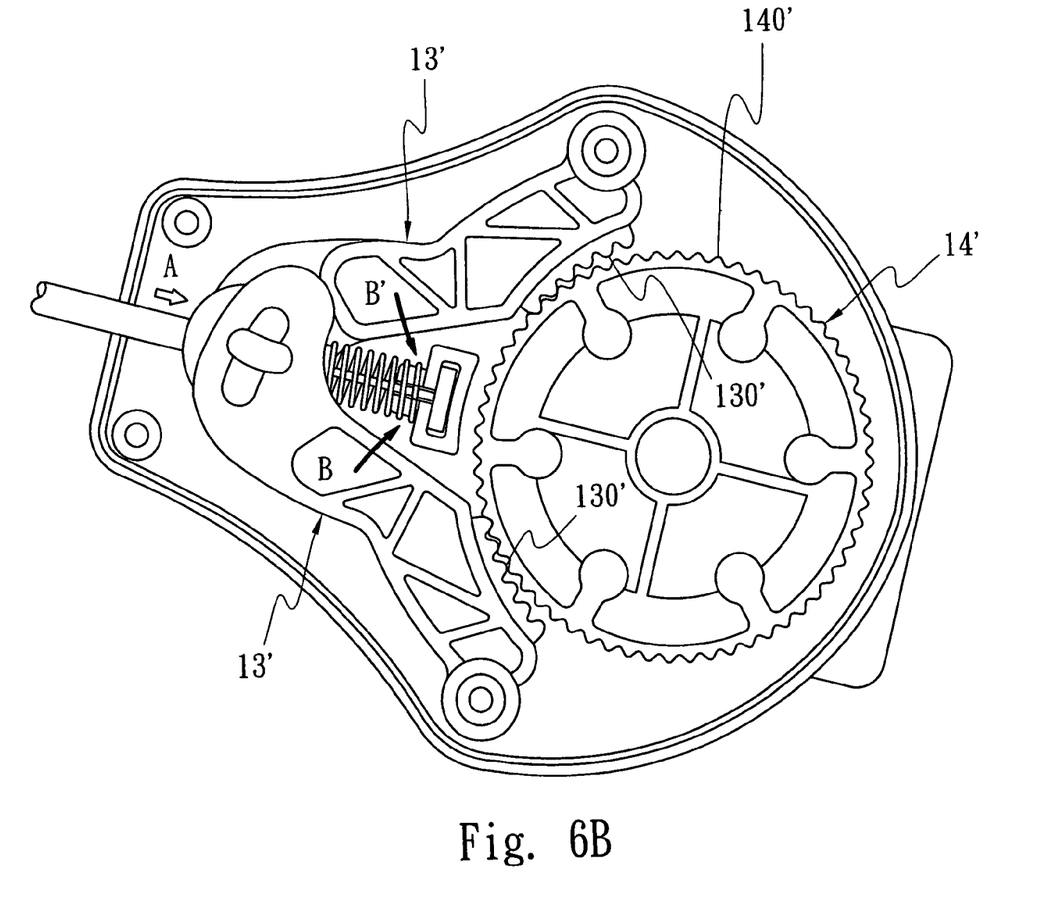

FIGS. 6A and 6B illustrate another embodiment of the braking mechanism of the present invention. As shown, the structure thereof is similar to that of the aforementioned embodiment, but both of the braking surfaces 130' of the pair of brake shoes 13' and the braking surface 140' of the brake band 14' are formed in shape of serration to increase the friction between. Alternatively, it is also possible to improve the friction between by making one of the braking surfaces 130' of the pair of brake shoes 13' and the braking surface 140' of the brake band 14' serrate.

Although the present invention is described in some preferred embodiments in conjunction with the accompanying drawings for better understanding, the scope thereof is not limited thereto and various changes or modifications may be provided by those skilled in the art without departing from the spirit and scope of the present invention.

The invention claimed is:

1. A braking mechanism installed on a wheel through a brake drum, comprising:
   a base connected to the brake drum;
   wherein the base includes therein:
   a connector comprising at least one pivot;
   a brake band embracing the brake drum to rotate along with the brake drum; and
   a pair of brake shoes, each having a slot in one end so as to connect with the pivot of the connector, and the other end of each brake shoe is disposed symmetrically and pivotally on the base, wherein the pivot of the connector is able to slide in the slots to bring the pair of brake shoes to move to contact with the brake band or to remove from the brake band.

2. The braking mechanism according to claim 1, further comprising a braking actuating device, wherein one end of the braking actuating device is coupled to the connector to actuate the movement of the connector, such that the pivot of the connector is able to slide in the slots of the pair of brake shoes.

3. The braking mechanism according to claim 2, wherein the other end of the pair of brake shoes is disposed on a lateral side of the brake band and is provided with an arc-shaped braking surface facing the brake band.

4. The braking mechanism according to claim 3, wherein an outer periphery of the brake band comprises a braking surface, and the braking surfaces of the pair of brake shoes both face the braking surface of the brake band.

5. The braking mechanism according to claim 4, wherein the braking surfaces of the pair of brake shoes and the braking surface of the brake band are even.

6. The braking mechanism according to claim 4, wherein the braking surfaces of the pair of brake shoes and the braking surface of the brake band are serrate.

7. The braking mechanism according to claim 4, wherein one of the braking surfaces of the pair of brake shoes and the braking surface of the brake band are serrate.

8. The braking mechanism according to claim 2, wherein
the braking actuating device is a brake cable set comprising a cable and a tube sleeved on a part of the cable;
one end of the cable is secured to the base; and
one end of the tube is connected to the connector.

9. The braking mechanism according to claim 8, further comprising a spring sleeving on the cable located between the connector and the end of the cable.

10. The braking mechanism according to claim 1, wherein an inner periphery of the brake band comprises at least one protrusion to engage with at least one recess on an outer periphery of the brake drum.

11. The braking mechanism according to claim 1, wherein a pair of pivots are disposed on a front surface and a rear surface of the connector, the pair of brake shoes are coupled to the pair of pivots respectively.

12. The braking mechanism according to claim 1, further comprising a cover mounted onto the base, the cover including an opening to expose a part of the brake drum.

13. A braking mechanism disposed on a wheel of a stroller, comprising:
a brake drum fixed to the wheel;
a brake band embracing the brake drum to rotate along with the wheel;
a base connected to the brake drum;
a connector operably moving on the base and comprising a pivot; and
a pair of brake shoes, each having a slot in one end to receive the pivot of the connector sliding within, and the other end of each brake shoe is disposed symmetrically and pivotally on the base,
wherein when the connector is moved, the pair of brake shoes are pivoted relative to the base so as to contact with the brake band.

14. The braking mechanism according to claim 13, further comprising a braking actuating device, wherein one end of the braking actuating device is coupled to the connector to actuate the movement of the connector.

15. The braking mechanism according to claim 14, wherein the brake band is a ring shape, and an inner periphery of the brake band comprises a plurality of protrusions to engage with a plurality of recesses on an outer periphery of the brake drum.

16. The braking mechanism according to claim 13, wherein the other end of the pair of brake shoes is disposed on a lateral side of the brake band and is provided with an arc-shaped braking surface facing the brake band.

* * * * *